March 15, 1932.    H. RUMSEY, JR    1,849,438
METHOD OF FORMING A MOLDED BODY
Filed Aug. 15, 1929    3 Sheets-Sheet 1

INVENTOR
Herbert Rumsey, Jr.,
BY
ATTORNEY.

March 15, 1932.   H. RUMSEY, JR   1,849,438
METHOD OF FORMING A MOLDED BODY
Filed Aug. 15, 1929   3 Sheets-Sheet 2

INVENTOR,
Herbert Rumsey, Jr.,
BY
ATTORNEY.

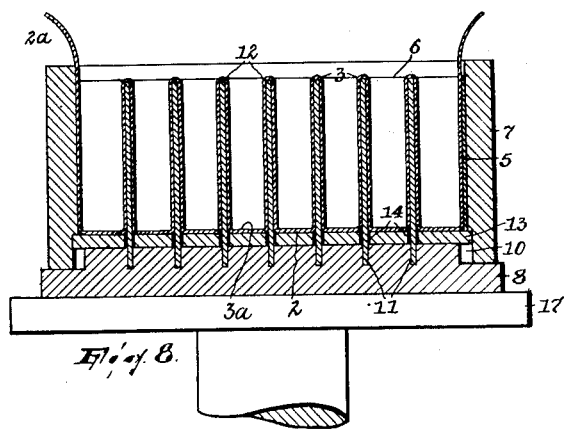
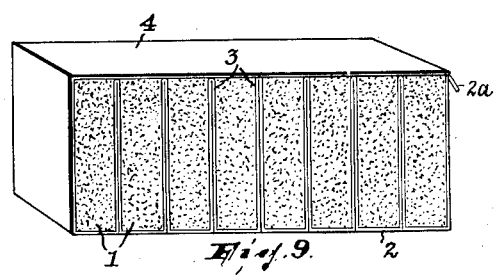
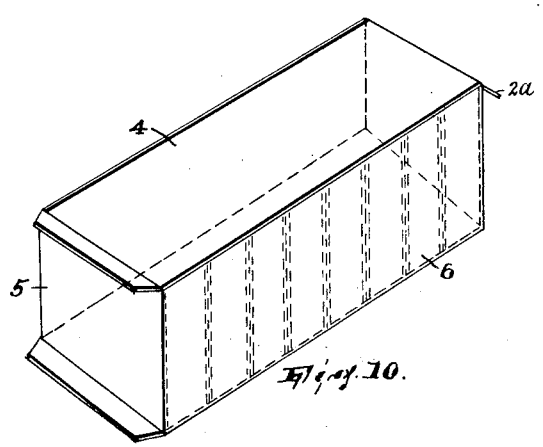

Patented Mar. 15, 1932

1,849,438

UNITED STATES PATENT OFFICE

HERBERT RUMSEY, JR., OF NUTLEY, NEW JERSEY

METHOD OF FORMING A MOLDED BODY

Application filed August 15, 1929. Serial No. 386,206.

This invention relates to the forming of a molded body, for instance, such as is set forth in my application Serial No. 377,722, comprising cakes, patties or other laminæ of plastic substance, as minced meat, interleaved with flexible sheet material. The object is to provide for the forming of such a body expeditiously and by simple procedure and apparatus, and in such a way as to avoid all handling of the plastic substance with possible contamination thereof where it is a food product.

In the accompanying drawings,

Fig. 8 shows the mold and said sheet 2 and piece 5 in section and illustrates a modification in the method;

Fig. 9 is a perspective view of the body formed, with the said piece omitted; and Fig. 10 is a similar view of said body, with said piece included.

Figure 1:
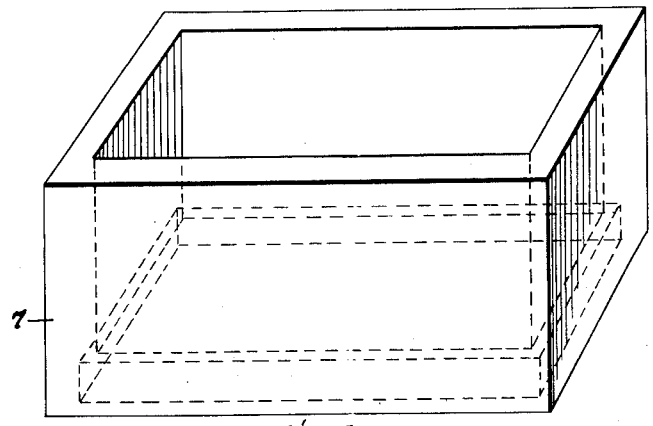
Figs. 1, 2 and 3 show in perspective the three parts of a mold in which said body is preferably formed.
Figure 2:
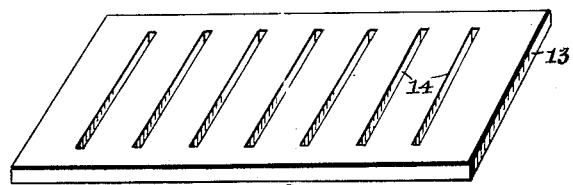
Figure 3:
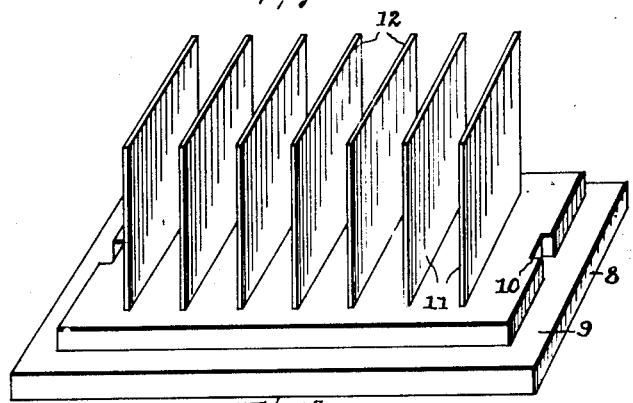

In the following description the invention is set forth by way of example only, for which purpose it is assumed that the body to be formed comprises (see Figs. 9 and 10) cakes, patties or other laminæ 1 of minced meat or other plastic substance, a sheet of flexible material 2 having spaced folds 3 all projecting in the same direction and forming partitions between such laminæ and consequently upwardly open pockets 3a receiving them and also preferably having an extension 4 to overlie and adhere to what is in Fig. 10 the top faces of the laminæ, and a piece of sheet material 5 which is so bent around the mass thus formed by the laminæ and sheet 2 that its end portions 6 overlie and adhere to the side faces of the laminæ, all as set forth in my said application. In the broader aspects of the invention, however, it will be understood that the body to be formed may be lacking in some of the details thus specified and may be otherwise modified, as will be apparent from the terms of the appended claims.

Referring to the apparatus preferably employed, let 7 denote the surrounding wall-structure of a mold and 8 its bottom, they being separable; the bottom has a top rabbet 9 to receive and hold against lateral displacement the wall-structure 7, and at opposite sides it may have opening outwardly to this rabbet the notches 10 for a purpose to appear. Upstanding from this bottom and arranged in parallel planes are spaced thin plates 11 which when the wall-structure and bottom are assembled are received by the former. The top edges 12 of these elements 11 form thin and substantially parallel spaced supports in the mold whereby the upstanding bends in the sheet material are maintained when the charging occurs; and if said elements are plates, as here, they will in the charging operation definitely confine and form or mold the part of the adhesive substance which is entered between them. 13 is a plate formed with slots 14 to receive elements 11. It forms a false bottom to rest on bottom 8.

15 is the charger. This is the delivery element of a conduit for the plastic substance leading from any such charging means as a meat-stuffing machine (not shown) and it has a number of nozzles 16 all terminating in the same plane and respectively adapted to enter and fill, with some clearance, the spaces which exist in the mold between the elements 11.

17 is a carrier for the mold. The charger and mold are preferably to assume telescoped relation to each other, and if the charger is fixed to the charging machine or for any other reason may not be movable for this purpose, said support may be movable toward and from the charger as indicated in Fig. 6 by the solid and dotted lines.

Figure 4:
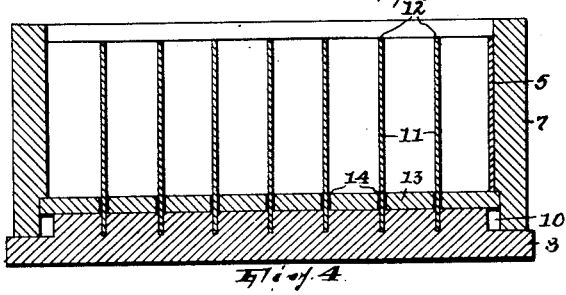
Fig. 4 is a longitudinal section of said mold parts, together with a certain piece of sheet material 5, assembled.

My method is performed as follows: The mold parts being assembled as they appear in any of the Figs. 4, 6 and 8, the sheet 2 of flexible material is arranged in traversing relation to the supports formed as stated by the top edges of the elements 11; subsequently, with the mold resting on its carrier 17 in such position that the several nozzles of the charger register with the spaces between said supports, a control device of the charging machine is operated to cause the plastic substance to be discharged by the charger in several streams respectively into said spaces, and as soon as said subtance occupies said spaces to the level of the supports (or other predetermined extent) the charging operation is terminated. The term "respectively" as here used has its ordinary meaning, to wit: related each to each as distinct from each to more than one.

Figure 5:
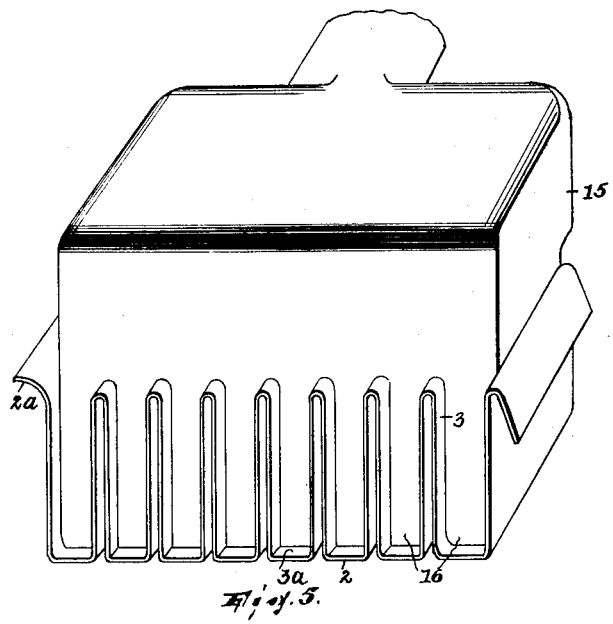
Fig. 5 is a perspective view of the mold charger, with the sheet of flexible material 2 which is to be interleaved with the laminæ of the plastic material assembled therewith preparatory to charging.

In accordance with my method as it is specifically practiced, however, it is to be understood that at least when there are a number of the said spaces to be charged (as shown in the drawings) it is indispensable to treat the sheet so that when the charging is done it will be already folded to form pockets 3a which may extend down into the spaces between the supports 12. This may be done by extending the sheet across the mouths of the charger nozzles and forming the folds 3 therein so as to reach up between the nozzles, as in Fig. 5; and if the charger and mold are actually to assume telescoped relation to each other as in the specific method I am describing, the pocket-forming portions of the sheet will then enter the spaces between the supports when this occurs and the pockets, since the folds straddle the supports 12, will be maintained by the latter. Or this may be done by extending the sheet across the supports and forming the folds 3 therein by means of the supports 12 and so that the pockets 3a reach at once down between the supports, as in Fig. 8.

Figures 6, 7:
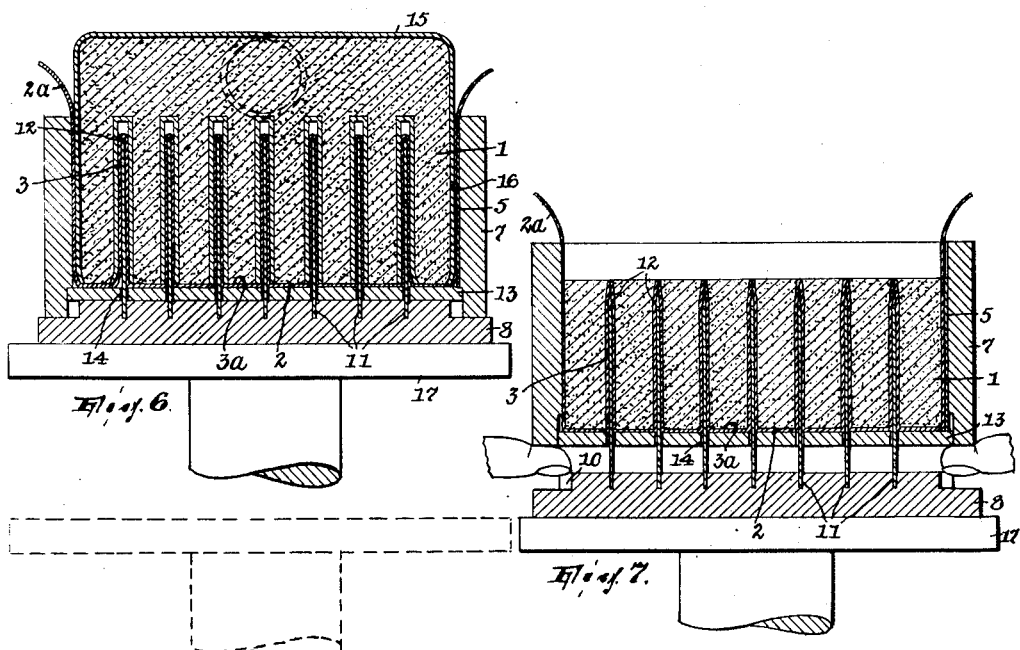
Fig. 6 is a longitudinal section of the mold, charger, sheet 2 and piece 5, the charger and mold being shown in the positions they occupy relatively to each other at the inception of the charging.
Fig. 7 shows the same parts, except the charger, in the same section but after the charging, and certain parts of the mold being separated.

Further, as my method is specifically practiced, the charger and mold are telescoped before the charging operation is started, as by raising the mold-supporting carrier from the dotted to the full-line position in Fig. 6. The charging is then started and as the plastic material is delivered the carrier is depressed until the charger and mold clear each other, when with a knife or the like, the charging operation being again stopped, the plastic substance is severed between them. The carrier being then still further depressed or shifted laterally to afford the necessary clearance, the extraction of the resulting molded body may be effected as hereinafter stated.

Further, the body to be formed being assumed in the present case to include the piece of sheet material 5, before the charging is done this piece is placed in the mold, bent, as shown in Figs. 4, 6, 7 and 8 so that its mid-portion is parallel to the plates 11 and at the end of the mold and its end portions 6 extended between their vertical edges and the adjoining sides of the wall-structure 7. On the molding being completed said piece will be left adhering to the sides of all the laminæ, as will the extension 4 of the sheet 2 which, after the mold and charger have been separated, may be made to reach over and adhere to the tops of the laminæ.

The body thus molded may be stripped from the mold by first raising the wall-structure 7 sufficiently to admit the attendant's fingers to the notches 10 and hence under the false-bottom 13, wherefrom the latter and said wall-structure may be elevated to clear said body from the elements 11, then said wall-structure removed and finally said body removed from the false-bottom and, as set forth in my said application, placed in a suitable carton from which the laminæ are withdrawable one by one by pulling on the projecting edge 2a of the sheet 2.

Having thus fully described my invention what I claim is:

1. The hereindescribed method of forming a molded body which consists in arranging a sheet of flexible material in traversing relation to the thin and substantially parallel spaced supports of a mold having such supports extending across its mold space, and then delivering pre-separated portions of a plastic substance against the sheet and respectively into those portions of the mold space which alternate with said supports.

2. The hereindescribed method of forming a molded body which consists in arranging a sheet of flexible material in traversing relation to the thin and substantially parallel spaced supports of a mold having such supports extending across its mold space, and then delivering pre-separated portions of a plastic substance against the sheet and into the respective portions of the mold space which alternate with said supports all at the same time.

3. The hereindescribed method of forming a molded body which consists in arranging a sheet of flexible material in the space of a mold and in transverse folds therein spaced from each other and projecting in substantially the same direction and delivering pre-separated portions of a plastic substance respectively into the spaces between said folds.

4. The hereindescribed method of forming a molded body which consists in arranging a sheet of flexible material in the space of a mold and in transverse folds therein spaced from each other and projecting in substantially the same direction and delivering pre-separated portions of a plastic substance into the respective spaces between said folds all at the same time.

5. The hereindescribed method of forming a molded body which consists in arranging a sheet of flexible material in traversing relation to the thin and substantially parallel spaced supports of a mold having such supports extending across its mold space and in transverse folds in the mold space and straddling the supports and thereby forming pockets in the sheet between such folds, and then delivering pre-separated portions of a plastic substance respectively into the pockets.

6. The hereindescribed method of forming a molded body which consists in arranging a sheet of flexible material in traversing relation to the thin and substantially parallel spaced supports of a mold having such supports extending across its mold space and in transverse folds in the mold space and straddling the supports and thereby forming pockets in the sheet between such folds, and then delivering pre-separated portions of a plastic substance respectively into the pockets all at the same time.

7. The hereindescribed method of forming a molded body which consists in delivering pre-separated portions of a plastic substance respectively into the divisions of a mold space having such space divided by mold partitions of sheet material removable from the mold and to which said substance will adhere.

8. The hereindescribed method of forming a molded body which consists in delivering pre-separated portions of a plastic substance respectively into the divisions of a mold space having such space divided by mold partitions of sheet material removable from the mold and to which said substance will adhere and consisting of folds of a single piece of sheet material projecting in substantially the same direction.

9. The hereindescribed method of forming a molded body which consists in delivering a plastic substance in pre-separated side-by-side streams into a mold space and separating the adjoining streams from each other in said space by sheet material forming removable mold partitions to which said substance will adhere.

10. The hereindescribed method of forming a molded body which consists in delivering a plastic substance in pre-separated side-by-side streams into a mold space and separating the adjoining streams from each other in said space by sheet material forming removable mold partitions to which said substance will adhere and consisting of folds of a single piece of said material projecting in substantially the same direction.

11. The hereindescribed method of forming a molded body which consists in arranging in the space of a mold and in transverse folds spaced from each other and projecting in substantially the same direction a sheet of flexible material and also a piece of sheet material flanking the lateral edges of the several folds and to which a plastic substance will adhere, and then delivering pre-separated portions of said substance into the mold and respectively into the spaces between said folds and in contact with said piece.

12. The hereindescribed method of forming a molded body which consists in placing a piece of sheet material to which a plastic substance will adhere in the space of a mold having said space divided by a row of spaced mold partitions of sheet material removable from the mold and so that said piece will flank the edges of said partitions at one side of the row, and then delivering pre-separated portions of said substance into the mold and respectively into the spaces between said partitions and in contact with said piece.

13. The herein described method of forming a molded body which consists in placing a piece of sheet material in traversing relation to the substantially parallel spaced supports of a mold having such supports extending across its mold space, causing nozzles to press against said piece and to enter between the supports and thus bend the piece into the spaces between the latter, and then passing plastic substance from the nozzles into said spaces.

In testimony whereof I affix my signature.

HERBERT RUMSEY, Jr.